United States Patent
Ziemer

(10) Patent No.: US 11,999,278 B2
(45) Date of Patent: Jun. 4, 2024

(54) SYSTEMS AND METHODS FOR SECURING A FABRIC COVER TO AN ARMREST

(71) Applicant: Seats Incorporated, Reedsburg, WI (US)

(72) Inventor: Daniel J. Ziemer, Reedsburg, WI (US)

(73) Assignee: Seats Incorporated

(*) Notice: Subject to any disclaimer, the term of this patent is extended or adjusted under 35 U.S.C. 154(b) by 147 days.

(21) Appl. No.: 17/698,894

(22) Filed: Mar. 18, 2022

(65) Prior Publication Data
US 2023/0294579 A1 Sep. 21, 2023

(51) Int. Cl.
| | |
|---|---|
| *B60N 2/72* | (2006.01) |
| *B60N 2/75* | (2018.01) |
| *A47C 31/02* | (2006.01) |
| *B60N 2/58* | (2006.01) |
| *B60N 2/60* | (2006.01) |

(52) U.S. Cl.
CPC ............. *B60N 2/72* (2013.01); *B60N 2/75* (2018.02); *A47C 31/023* (2013.01); *B60N 2/5825* (2013.01); *B60N 2/6027* (2013.01)

(58) Field of Classification Search
CPC ...... B60N 2/5825; B60N 2/6027; B60N 2/72; A47C 31/023
See application file for complete search history.

(56) References Cited

U.S. PATENT DOCUMENTS

| | | | | |
|---|---|---|---|---|
| 5,820,213 | A * | 10/1998 | Severinski | A47C 31/023 24/336 |
| 7,891,735 | B2 * | 2/2011 | Oku | B60N 2/5825 297/218.5 |
| 9,809,137 | B2 * | 11/2017 | Kheil | B60N 2/5841 |
| 10,473,136 | B2 * | 11/2019 | Line | B60N 2/682 |
| 11,091,077 | B2 * | 8/2021 | Karges | B60N 2/5825 |
| 11,332,056 | B2 * | 5/2022 | Eldridge | B60N 2/5825 |
| 2012/0272483 | A1 * | 11/2012 | Moore | F16B 2/22 24/3.12 |

FOREIGN PATENT DOCUMENTS

| | | |
|---|---|---|
| DE | 102011089811 A1 | 6/2013 |
| WO | 2014139933 A1 | 9/2014 |

OTHER PUBLICATIONS

International Search Report of related PCT/US2023/064538, dated Jul. 6, 2023, 3 pages.
Written Opinion of related PCT/US2023/064538, dated Jul. 6, 2023, 5 pages.

* cited by examiner

*Primary Examiner* — Syed A Islam
(74) *Attorney, Agent, or Firm* — Quarles & Brady LLP

(57) ABSTRACT

Systems and methods are provided for an armrest assembly for a seat installed within a cab of a vehicle. The armrest assembly can include a cover retention bracket having channels for receiving an arm cover in preparation for covering an armrest. The cover retention bracket can have one or more protrusions arranged along the channels and configured to engage the cover to secure the cover to the armrest.

20 Claims, 13 Drawing Sheets

SYSTEMS AND METHODS FOR SECURING A FABRIC COVER TO AN ARMREST

CROSS-REFERENCE TO RELATED APPLICATIONS

Not applicable.

BACKGROUND

Seat assemblies for vehicles can include a seating portion and a base portion. In some applications, one or more armrest assemblies are coupled to seat assembly to support an arm of a user.

SUMMARY

Some aspects of the invention provide an improved armrest assembly for a seat installed within a cab of a vehicle. Embodiments of the armrest assembly can generally include a cover retention bracket having channels for receiving a fabric arm cover in preparation for covering an armrest. The cover retention bracket can have one or more protrusions arranged along the channels that are configured to engage and grip the fabric cover, particularly when the fabric arm cover is stretch over the armrest.

Some aspects of the invention provide an armrest for a vehicle seat. The armrest comprises a frame defining an elongate axis extending along a length of the armrest, a flexible cover that at least partially surrounds the frame in an installed configuration, and a cover retention plate arranged adjacent to a distal end of the frame to secure the flexible cover. The cover retention plate includes a first channel and a second channel arranged approximately parallel to the elongate axis of the frame. Each of the first and second channels receive a respective portion of the flexible cover with the cover in the installed configuration. The cover retention plate further includes a central portion arranged between the first channel and the second channel, a first lateral portion arranged along an edge of the first channel opposite the central portion, a second lateral portion arranged along an edge of the second channel opposite the central portion, and at least one protrusion extending away from at least one of the central portion, the first lateral portion, or the second lateral portion to secure the flexible cover in the installed configuration.

Some aspects of the invention provide a cover retention mechanism for securing a fabric or other cover to a vehicle seat component. The cover retention mechanism comprises a bracket including a retention feature defining a central portion, a first lateral portion, and a second lateral portion. The cover retention mechanism further comprising a first channel arranged between the central portion and the first lateral portion, and defining a first reference axis extending between a first open end at a distal end of the retention feature and a first terminal end opposite the first open end, a second channel arranged between the central portion and the second lateral portion, and defining a second reference axis extending between a second open end at the distal end of the retention feature and a second terminal end opposite the second open end, a first protrusion array extending away from the retention feature along the first channel, and a second protrusion array extending away from the retention feature along the second channel. The first and second channels are configured to receive a portion of a fabric or other cover. The first and second protrusion arrays are configured to engage the fabric or other cover when the fabric or other cover is received within the first and second channels.

Some aspects of the invention provide a method of installing a flexible cover on an armrest assembly for use with a vehicle seat. The method comprises, with a nose portion of a flexible cover turned inside-out, inserting the nose portion into open ends of first and second channels of a cover retention feature that is coupled to a frame of the armrest assembly, inverting the nose portion of the flexible cover, with the nose portion received in the first and second channels of the cover retention feature, such that an external surface of the nose portion is facing an exterior of the armrest assembly. Upon inverting the nose portion of the flexible cover, a first array of protrusions extending from the cover retention feature along the first channel and a second array of protrusions extending away from the cover retention feature along the second channel engage the nose portion of the flexible cover to retain the flexible cover in an installed configuration on the armrest assembly.

These and other features of the present disclosure will become more apparent from the following description of the illustrative embodiments.

Figure 1:
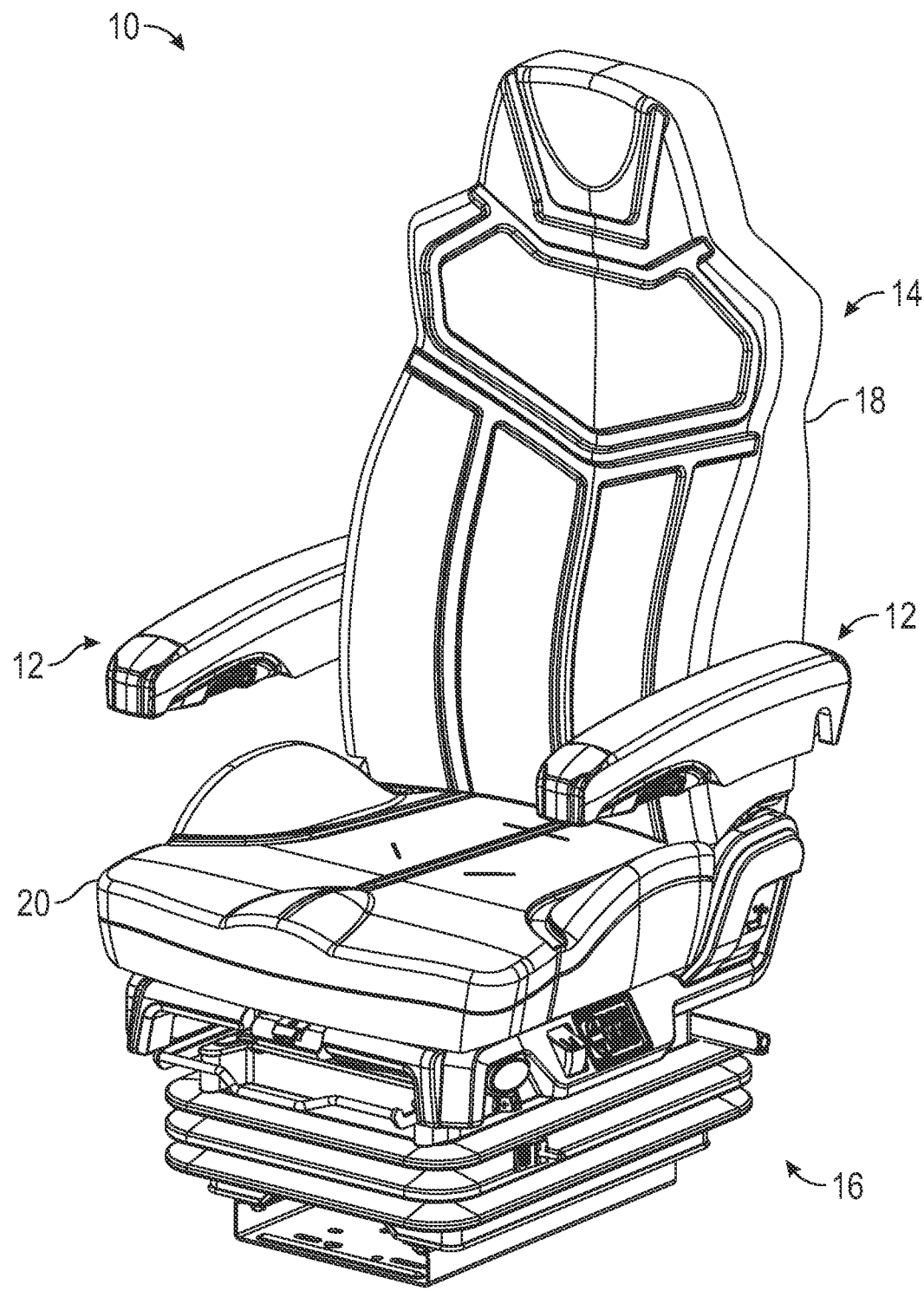
FIG. 1 is a front isometric view of a seat assembly with a pair of armrest assemblies according to an aspects of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

As used herein, unless otherwise limited or defined, "substantially parallel" indicates a direction that is within ±12 degrees of a reference direction. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

As also used herein, unless otherwise limited or defined, "substantially perpendicular" indicates a direction that is within ±12 degrees of perpendicular a reference direction. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

As used herein, unless otherwise limited or defined, "integral" and derivatives thereof (e.g., "integrally") describe elements that are manufactured as a single piece without fasteners, adhesive, or the like to secure separate components together. For example, an element stamped or cast as a single-piece component from a single piece of sheet metal or a single mold, without rivets, screws, or adhesive to hold separately formed pieces together is an integral (and integrally formed) element. In contrast, an element formed from multiple pieces that are separately formed initially then later connected together, is not an integral (or integrally formed) element.

As used herein in the context of a vehicle seat or armrest, unless otherwise defined or limited, the term "lateral" refers to a direction that extends at least partly to a left or a right side of a front-to-back reference line defined by the vehicle seat or armrest (e.g., an elongate axis of an defined by an armrest). Similarly, an "elongate axis" of an armrest refers to a reference line that extends in a front-to-back direction of a vehicle seat (e.g., from a front of a seat base towards the seat back).

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

According to some aspects, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Conventional seating assemblies can include one or more armrest assemblies including an arm cover wrapped or otherwise coupled around an armrest. According to some examples, an arm cover can be made of a fabric material (or composition of materials) that is coupled to the arm cover, or an internal frame of the armrest, using fasteners (e.g., staples, hog rings, screws, etc.). In some cases, an internal frame/adjustment mechanism is installed into the arm cover, which clamps the fabric material between the internal frame and the foam arm cover. According to other examples, a pre-fabricated fabric cover in the shape of the armrest can be slipped over a frame and then portions of the fabric cover can be secured together using a zip fastener or button fastener (e.g., a zipper) to cover the armrest. According to another example, an external cover or panel can be installed onto an internal frame of the armrest to clamp a fabric cover to the armrest. For conventional designs, installing the fabric cover onto the armrest can be labor intensive, in terms of both the physical demand and the time required to accomplish the installation. Additionally, portions of the cover, particularly around the nose of the armrest, can easily become uncoupled and pulled away from the armrest. Further, particularly when external panels are used to clamp a fabric cover to the armrest, hard and unergonomic materials are utilized to handle the heavy clamping loads, typically requiring the external panel to be secured using bolts or screws to provide the appropriate clamping force.

As detailed below, aspects of the invention can provide improved armrest assemblies for seat assemblies, including as can address the shortcomings described above. For example, some aspects of the invention include an armrest assembly including a cover retention feature (e.g., bracket) having channels for receiving a flexible arm cover (e.g., during an installation process, in preparation for covering the armrest). The cover retention bracket can have one or more protrusions (e.g., teeth) arranged along the channels to engage the cover, particularly when the fabric arm cover is stretched over the armrest. In some embodiments, an array of progressively taller protrusions can extend between a closed end of a channel and an open end of the channel (e.g., with a tallest protrusion toward the open end), to provide improved grip on fabric and other cover materials, including as the cover material is stretched during an installation process. In some embodiments, protrusions with laterally distal curved profiles can be arranged in alternating arrays on opposing sides of a channel, to provide improved ease of installation and improved retention relative to pull-out forces.

FIG. 1 illustrates a seat assembly 10 including at least one armrest assembly 12 according to one example of the invention. In the illustrated example, the seat assembly 10 includes a seating portion 14 and a base portion 16. The seating portion 14 of the seat assembly 10 includes a seat back 18 coupled to a seat base 20. The armrest assembly 12 can be rigidly or pivotally coupled to one or both of the seat back 18 or the seat base 20. In the illustrated example, the armrest assembly 12 is pivotally coupled to the seat back 18. According to the illustrated example, the seat assembly 10 includes a set of armrest assemblies 12 arranged on left and right sides of the seat back 18 (e.g., substantially identical assemblies, as shown).

Figure 2:
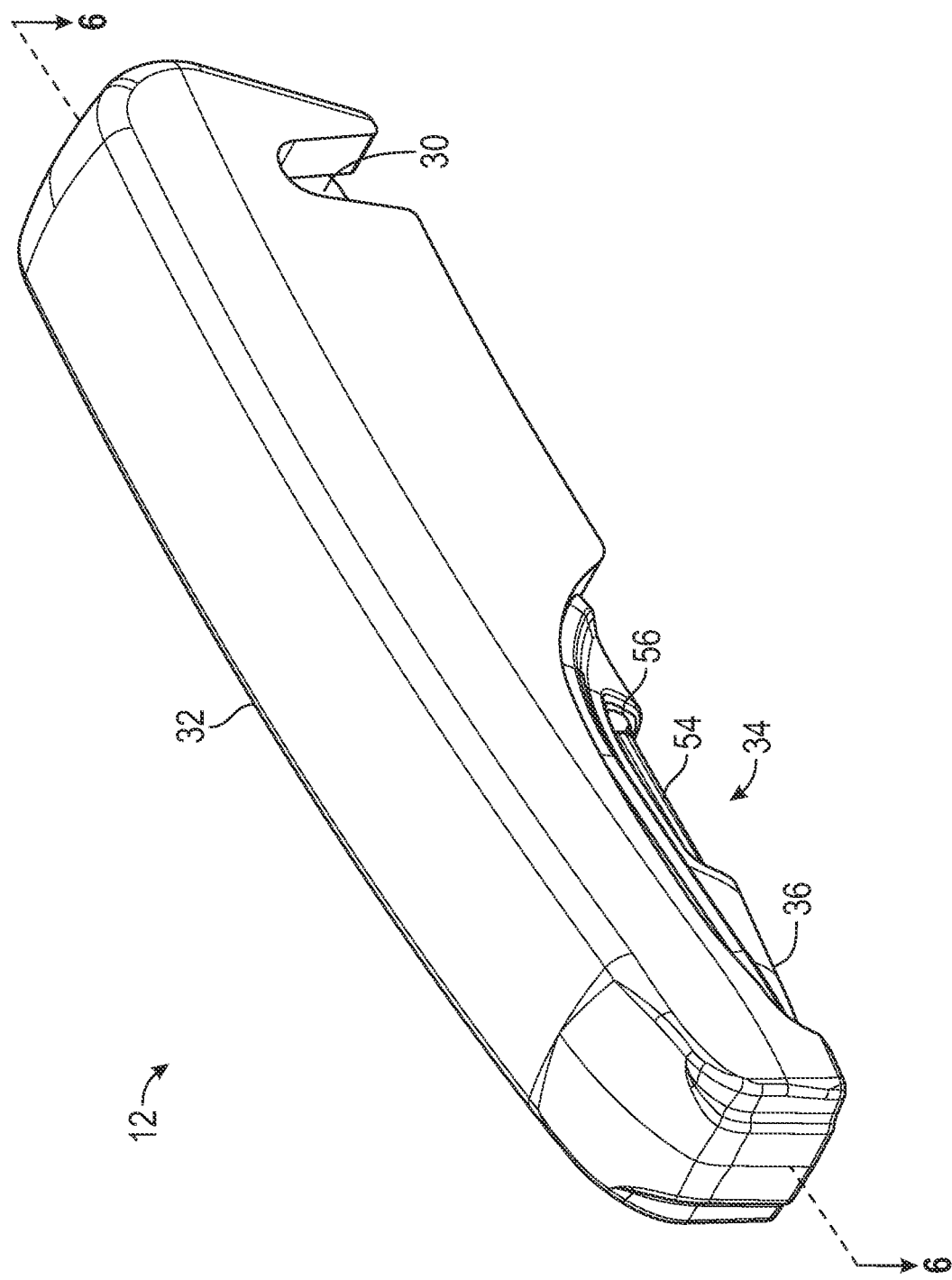
FIG. 2 is a front isometric view of an armrest assembly of the seat assembly of FIG. 1.
Figure 3A:
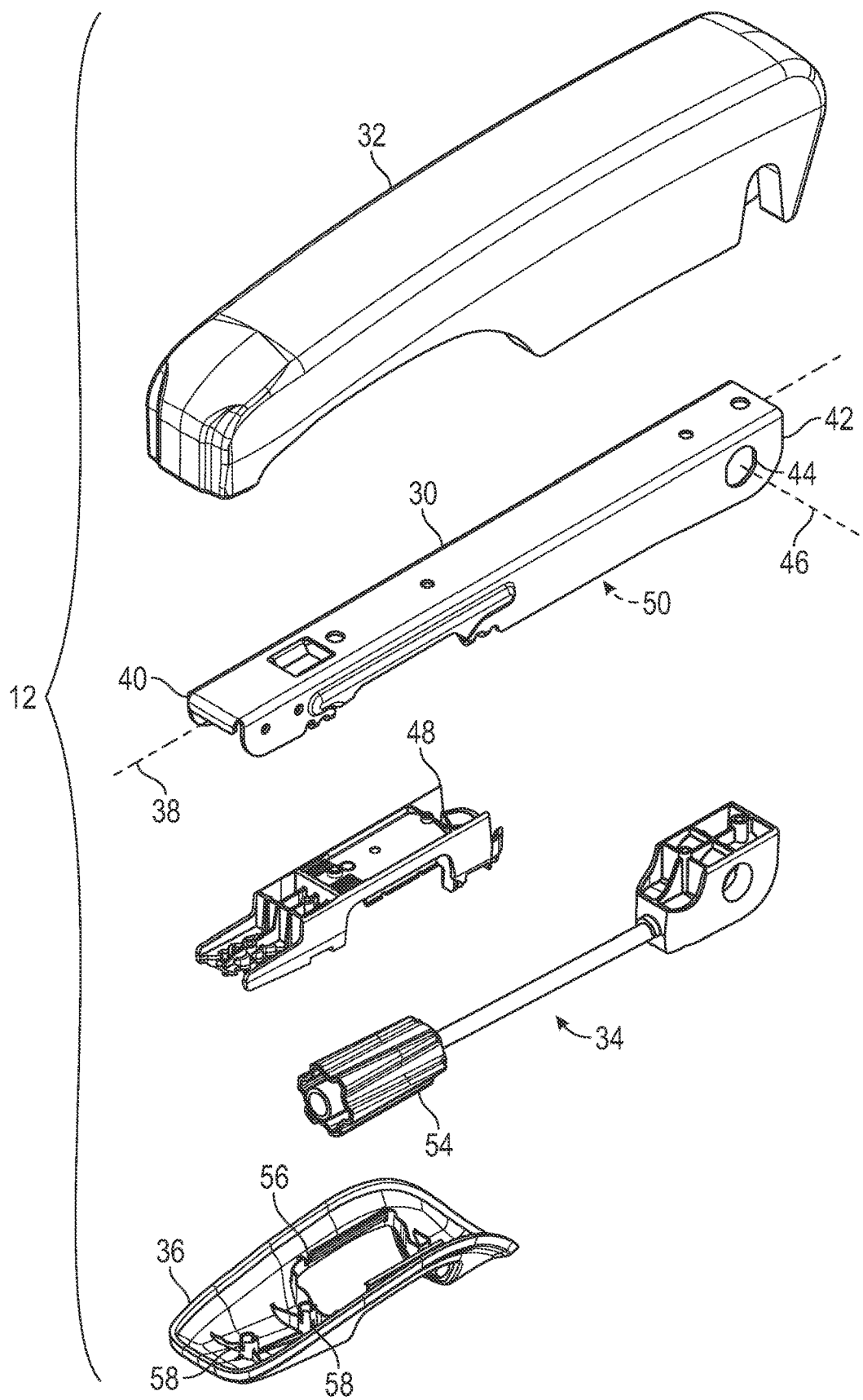
FIG. 3A is a partially exploded view of the armrest assembly of FIG. 2.

FIGS. 2 and 3A illustrate an armrest assembly 12 according to one example of the invention. In the illustrated example, a cover is not illustrated to reveal the underlying components. Although reference is made below to fabric covers, in other examples, similarly flexible non-fabric covers can be used (e.g., covers formed from molded or other synthetic material, etc.). The armrest assembly 12 can include a frame 30, an arm pad 32, an adjustment mechanism 34, and an external shell 36. The frame 30 can provide a support structure for the components of the armrest assembly 12 and be coupled to the seat assembly 10 (see FIG. 1). As shown in FIG. 3A in particular, the frame 30 can extend along an elongate axis 38 from a first end 40 (e.g., a nose end) towards an opposing second end 42 (e.g., a pivot/support end). The first end 40 can be arranged near the nose of the armrest (e.g., the point furthest away from the seat back 18, see FIG. 1). The second end 42 can be arranged near the portion of the frame 30 that is coupled to the seat assembly 10. In the illustrated example, the second end 42 of the frame 30 includes an opening 44 extending through the frame 30 in a lateral direction to receive a support (not shown) for coupling the armrest assembly 12 to the seat assembly 10. The opening 44 can define a pivot axis 46, about which the armrest assembly 12 rotates relative to the seat back 18 (see FIG. 1) to adjust an orientation of the armrest assembly 12. The arm pad 32 can be formed of a foam or rubber padding material and can cover an upper portion and at least part of the lateral sides of the frame 30. In some cases, a differently shaped pad, or no pad, can be included. Likewise, other armrest frames, etc. an exhibit a variety of other forms.

Figure 3B:
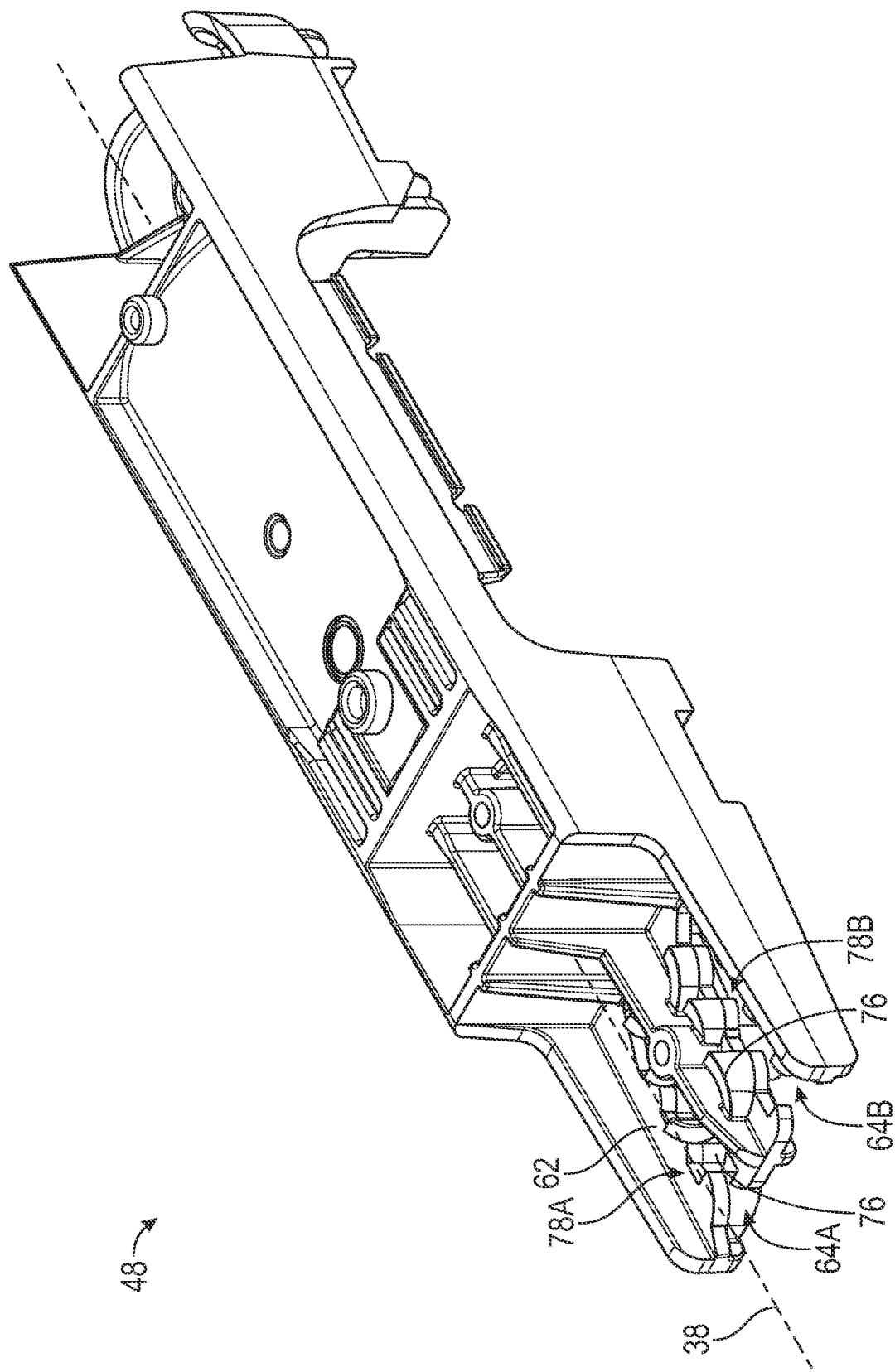
FIG. 3B is a front isometric view of a cover retention bracket of the armrest assembly of FIG. 2.
Figure 4:
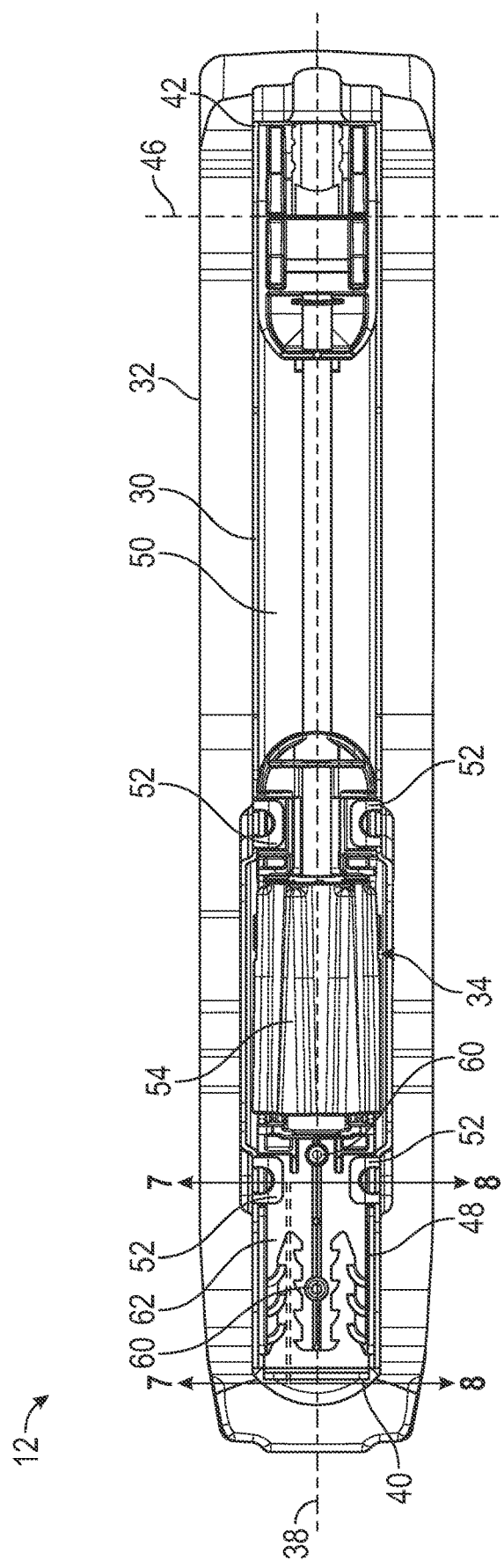
FIG. 4 is a bottom plan view of the armrest assembly of FIG. 2.

Referring now to FIGS. 3A, 3B, and 4, the armrest assembly 12 can also include a cover retention bracket 48 coupled to the frame 30. The cover retention bracket 48 can be arranged adjacent to a distal end of the frame 30. In the illustrated example, the cover retention bracket 48 is coupled to the frame 30 at the first end 40 thereof. However, in other examples, the cover retention bracket can be coupled to the frame 30 at the opposing second end 42. The cover retention bracket 48, as will be described, is configured to secure a portion of a flexible cover (see, e.g., FIG. 10) to the armrest assembly 12. The cover retention bracket 48 can be formed integrally with the frame 30, or coupled to the frame 30 as a separate component. In the illustrated example, the cover retention bracket 48 is coupled to the frame 30 along an underside thereof within a channel 50 defined by the frame 30. For example, the frame 30 can be formed from a sheet of metal and shaped, stamped, or otherwise folded to form the channel 50. In the illustrated example, the cover retention bracket 48 can be coupled to the frame 30 via one or more tabs 52 integral to the frame 30, such that the tabs 52 can be bent or folded over to engage a portion of the cover retention bracket 48 to secure the cover retention bracket 48 to the frame 30. The frame 30, in this specific example, includes four tabs 52 for securing the cover retention bracket 48 to the frame 30. According to other examples, the cover retention bracket 48 can be coupled to the frame 30 using one or more fasteners (e.g., bolts, screws, rivets, etc.). The cover retention bracket 48 can be made from a plastic material, and in the illustrated example, formed by an injection molding process. According to other examples, the cover retention bracket 48 can be 3D printed according to various known additive manufacturing processes.

The adjustment mechanism 34 can be coupled between the cover retention bracket 48 and the frame 30 and arranged within the channel 50 of the frame 30. The adjustment mechanism 34 is configured to selectively adjust a rotational position of the armrest assembly 12 relative to the seat assembly 10 about the pivot axis 46. For example, when the armrest assembly 12 is in a lowered position, a handle 54 of the adjustment mechanism can be adjusted (e.g., rotated about the elongate axis 38) to adjust the rotational position of the armrest assembly 12.

As best illustrated in FIG. 3A, the external shell 36 includes a cover opening 56 to provide access to the handle 54 of the adjustment mechanism 34. The external shell 36 can also include one or more press-fit bosses 58 extending away from an interior surface of the external cover, which correspond and align with one or more pegs 60 extending away from an underside of the cover retention bracket 48 towards the external shell 36. The external shell 36 can be coupled to the armrest assembly 12 by pressing the press-fit bosses 58 onto the pegs 60 of the cover retention bracket 48. According to other examples, the external shell 36 can be coupled to one or both of the frame 30 and the cover retention bracket 48 by one or more fasteners.

Figure 5:
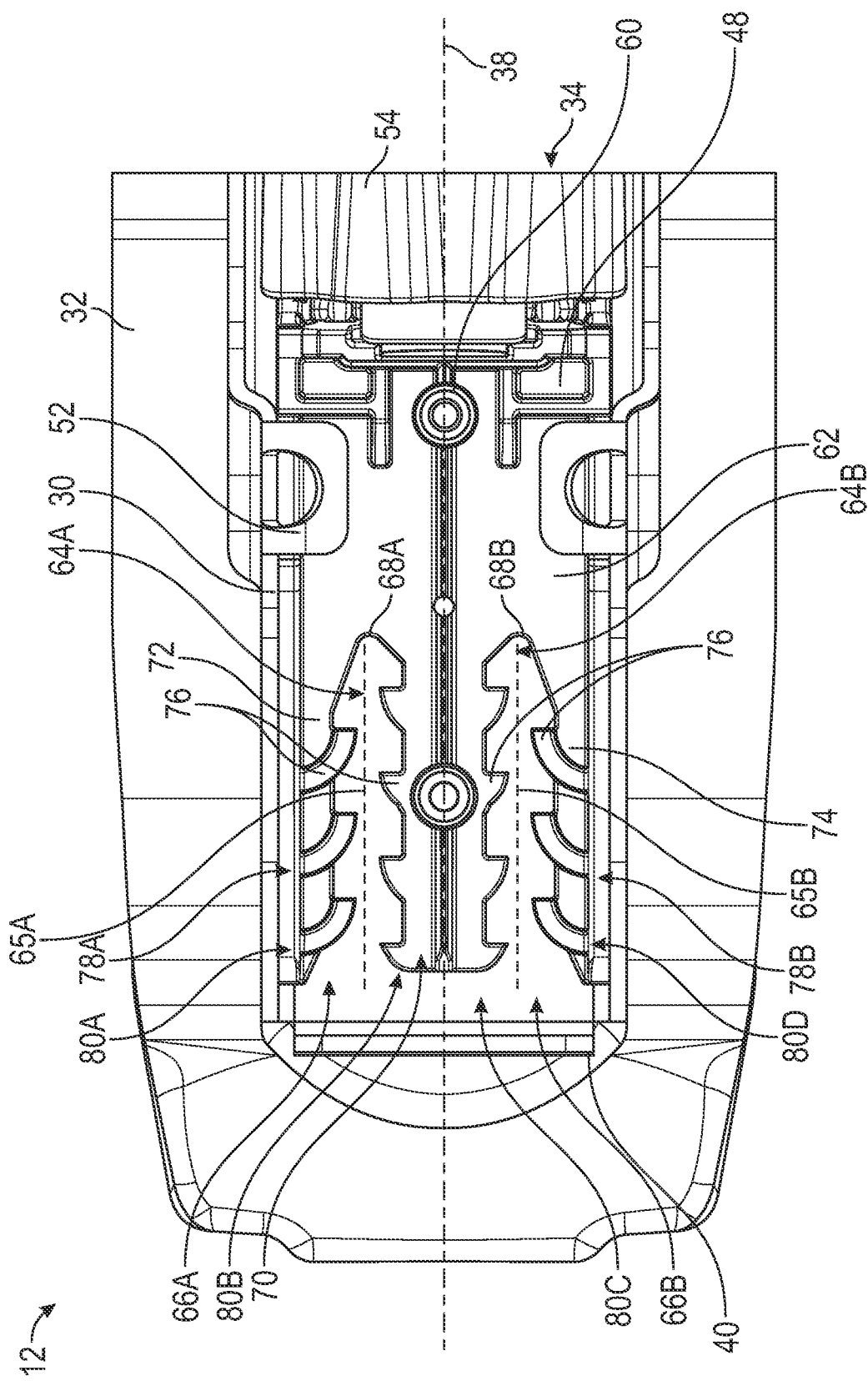
FIG. 5 is a bottom plan partial view of the armrest assembly FIG. 2 with a lower external shell removed to reveal the underlying structure.
Figure 6:
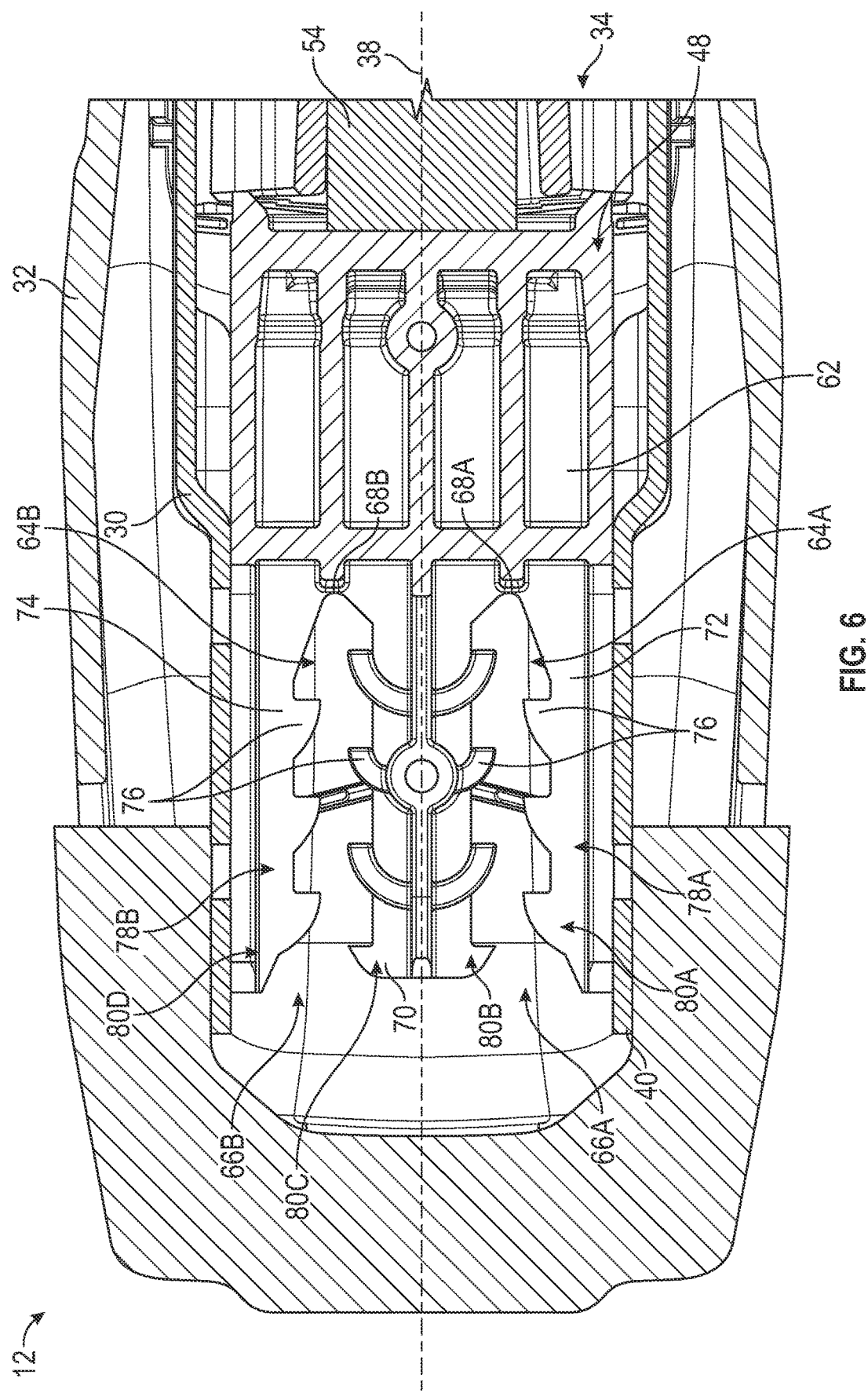
FIG. 6 is a top plan cross-sectional partial view of the armrest assembly of FIG. 2 taken along line 6-6 of FIG. 2.

With reference to FIGS. 5 and 6, the cover retention bracket 48 (or other seat assembly structure) can include a cover retention feature, configured in the illustrated example as a cover retention plate 62 spanning between lateral sides of the frame 30. As used herein, "plate" refers to extended features of a larger body that exhibit a reduced height dimension relative to the larger body, particularly when formed as an integral extension with a generally planar overall aspect (e.g., extending substantially along a plane, with various deviations in the form of protrusions, openings, etc.). For example, in the illustrated embodiment, as further discussed below, the plate 62 is an integrally molded extension of the bracket 48 that extends substantially along a reference plane (e.g., mold part-line plane) and includes various retention protrusions extending at various heights away therefrom. In other embodiments, a similar cover retention feature (or others) can be included in other non-plate structures.

Generally, as also discussed above, a retention plate can include multiple channels (e.g., separate by one or more cantilevered central structures) to receive and secure the material of a flexible cover. In the illustrated example, the plate 62 includes a first channel 64A and a second channel 64B extending through the plate 62 from the first end 40 towards the second end 42 of the frame 30. In particular, the channels 64A, 64B are formed as blind slots, although other configurations are possible. As will be described, the first and second channels 64A, 64B are configured to receive a portion of a flexible cover (e.g., fabric cover 90, see FIG. 11)

during installation of the cover onto the armrest assembly 12, and to assist in stretching and securing the cover onto the armrest assembly 12.

Each of the first and second channels 64A, 64B, respectively, define an open end 66A, 66B at a distal end of the cover retention bracket 48 (e.g., adjacent to the first end 40 of the frame 30) and a terminal (e.g., closed, as shown) end 68A, 68B opposite the open end 66A, 66B. In the illustrated example, a lateral width of the channel narrows at the terminal ends 68A, 68B. In the illustrated embodiment, the first and second channels 64A, 64B are arranged approximately parallel to each other (e.g., parallel to the elongate axis 38). That is, a first reference axis 65A extending between the open end 66A and the terminal end 68A of the first channel 64A can be substantially parallel to a second reference axis 65B extending between the open end 66B and the terminal end 68B. In the illustrated example, the first and second reference axes 65A, 65B are parallel to the elongate axis 38. In other embodiments, first and second channels 64A, 64B can be arranged at an angle relative to the elongate axis 38 or can define curved insertion directions (e.g., in contrast to a linear insertion direction along the channels 64A, 64B). In some cases, a particular assembly may not include an elongate axis (or direction), or a reference axis (e.g., along an insertion direction, similar to the axes 65A, 65B) may be perpendicular or obliquely angled relative to an elongate axis. The first and second channels 64A, 64B are defined on the plate 62 by a central portion 70 arranged between the first and second channels 64A, 64B, a first lateral portion 72 arranged adjacent to a lateral edge of the first channel 64A, and a second lateral portion 74 arranged adjacent to an opposing lateral edge of the second channel 64B.

As illustrated in FIGS. 5 and 6, the cover retention bracket 48 can include one or more protrusions 76 extending away from surfaces of the central portion 70, the first lateral portion 72, or the second lateral portion 74 of the plate 62. The protrusions 76 are configured as curved, tapered teeth in the illustrated example, although other configurations are possible. In general, one or more protrusions can extend into a relevant channel (e.g., the first and second channels 64A, 64B), at least as projected from a perspective transverse to an insertion direction for the channel, onto a plane defined between opposite edges of the channel (e.g., as illustrated in the views of FIGS. 5 and 6). In the illustrated example, the cover retention bracket 48 includes a first protrusion array 78A arranged along and extending into the first channel 64A and a second protrusion array 78B arranged along and extending into the second channel 64B. The first protrusion array 78A can include a first set of protrusions 80A arranged along the first lateral portion 72 of the plate 62 and a second set of protrusions 80B arranged along the central portion 70 of the plate 62 along the first channel 64A. Similarly, the second protrusion array 78B can include a third set of protrusions 80C arranged along the second lateral portion 74 of the plate 62 and a fourth set of protrusions 80D arranged along the central portion 70 of the plate 62 along the second channel 64B. Each of the sets of protrusions 80A-80D can themselves include a plurality of protrusions 76 spaced apart from one another along the first and second channels 64A, 64B. In some embodiments, including as shown, protrusion arrays on opposing sides of a channel (e.g., the protrusion arrays 78A, 78B) can form a larger array with an alternating arrangement distal ends of the protrusions along the channel.

As best illustrated in FIGS. 5 and 6, the cover retention bracket 48 can be symmetric about the elongate axis 38. Therefore, aspects of the protrusions 76 along the first channel 64A are identical to those of the protrusions 76 along the second channel 64B owing to the symmetric design of the cover retention bracket 48 being reflected across the elongate axis. Accordingly, in the following discussion, aspects of the protrusions 76 may only be described relative to the first protrusion array 78A along the first channel 64A, however aspects of the second protrusion array 78B are generally identical to those of the first protrusion array 78A, unless otherwise shown or described. In other embodiments, however, retention features (e.g., retention plates) may not be laterally symmetric.

Continuing with FIGS. 5 and 6, the protrusions 76 extend laterally into the first and second channels 64A, 64B. According to the illustrated example, each of the plurality of protrusions 76 also defines a curved profile. For example, with respect to the first set of protrusions 80A in the first protrusion array 78A, each of the protrusions 76 can initially extend from the first lateral portion 72 of the plate 62 towards the central portion 70 (e.g., towards the elongate axis 38), and curve in a direction towards the terminal end 68A of the first channel 64A (e.g., away from the first end 40 of the frame 30). With respect to the second set of protrusions 80B in the first protrusion array 78A, each of the protrusions 76 can initially extend from the central portion 70 of the plate towards the first lateral portion 72 (e.g., away from the elongate axis 38), and curve in a direction towards the terminal end 68A of the first channel 64A. In some implementations, the protrusions 76 being curved in a direction towards the terminal end 68A of the first channel 64A allow for easy insertion of a flexible cover into the first channel 64A in an insertion direction, and resists removal of the flexible cover by hindering movement of the flexible cover in a direction towards the open end 66A of the first channel 64A (i.e., opposite the insertion direction).

In some embodiments, as also noted above, protrusions on opposing sides of a particular channel can exhibit an alternating arrangement, so that a seat cover being inserted into the channel in an insertion direction is successively alternatingly engaged by protrusions on opposing sides of the channel with regard to both insertion and pull-out forces. In this regard, in the illustrated example, the protrusions 76 along the first channel 64A can be staggered relative to one another, thereby forming a "zig-zag" pathway through the first channel 64A. For example, with respect to an axial length of the first channel 64A (e.g., with respect to the elongate axis 38 or the first reference axis 65A), a protrusion 76 from the first set of protrusions 80A can be arranged axially between two adjacent protrusions 76 from the second set of protrusions 80B. This staggered arrangement of protrusions 76 can further aid in resisting removal of a flexible cover once the flexible cover is received within the first channel 64A.

As previously described, the first and second channels 64A, 64B can include a plurality of protrusions 76. In the illustrated example, the number of protrusions 76 along the central portion 70 (e.g., the second or third sets of protrusions 80B, 80C) can be greater than the number of protrusions 76 along the first and second lateral portions 72, 74 (e.g., the first or fourth sets of protrusions 80A, 80D). According to other examples, the number of protrusions 76 along the central portion 70 can be less than or equal to the number of protrusions 76 along the first and second lateral portions 72, 74. In the illustrated example, four protrusions 76 are arranged on the central portion 70 along the first channel 64A. However, in other examples, more or less than four protrusions 76 can be included on the central portion 70 along the first channel 64A. In the illustrated example, three protrusions are arranged on the first lateral portion 72 along the first channel 64A. However, in other examples, more or less than thee protrusions 76 can be included on the first lateral portion 72 along the first channel 64A.

In some embodiments, heights of protrusions in a protrusion array can generally decrease along an insertion direction for a corresponding channel, including as may provide improved retention of cover material as compared to conventional designs. As used herein, discussion of height refers to an absolute length in a relevant direction rather than a positive or negative distance relative to a reference origin. For example, a protrusion that extends upwardly from a reference feature by a first distance can be considered to have the same height as a protrusion that extends downwardly from the reference feature by the first distance, although the heights of the protrusions extend in opposite directions.

Figure 7:
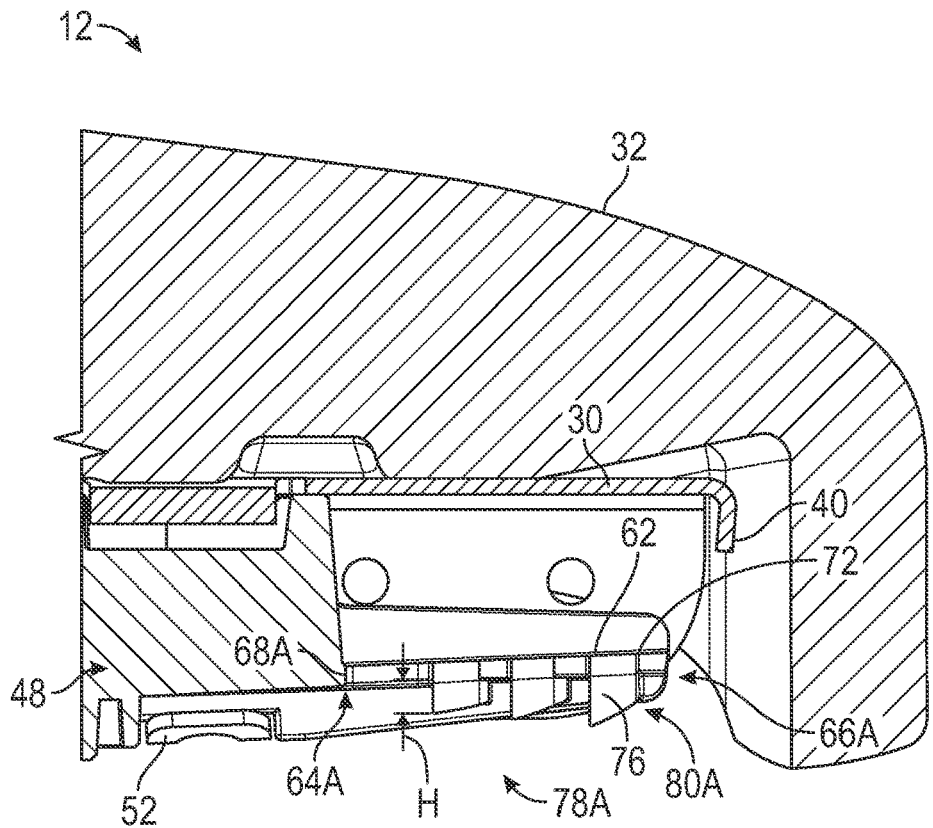
FIG. 7 is a right side elevation cross-sectional partial view of the armrest assembly of FIG. 2 taken along line 7-7 of FIG. 4.
Figure 8:
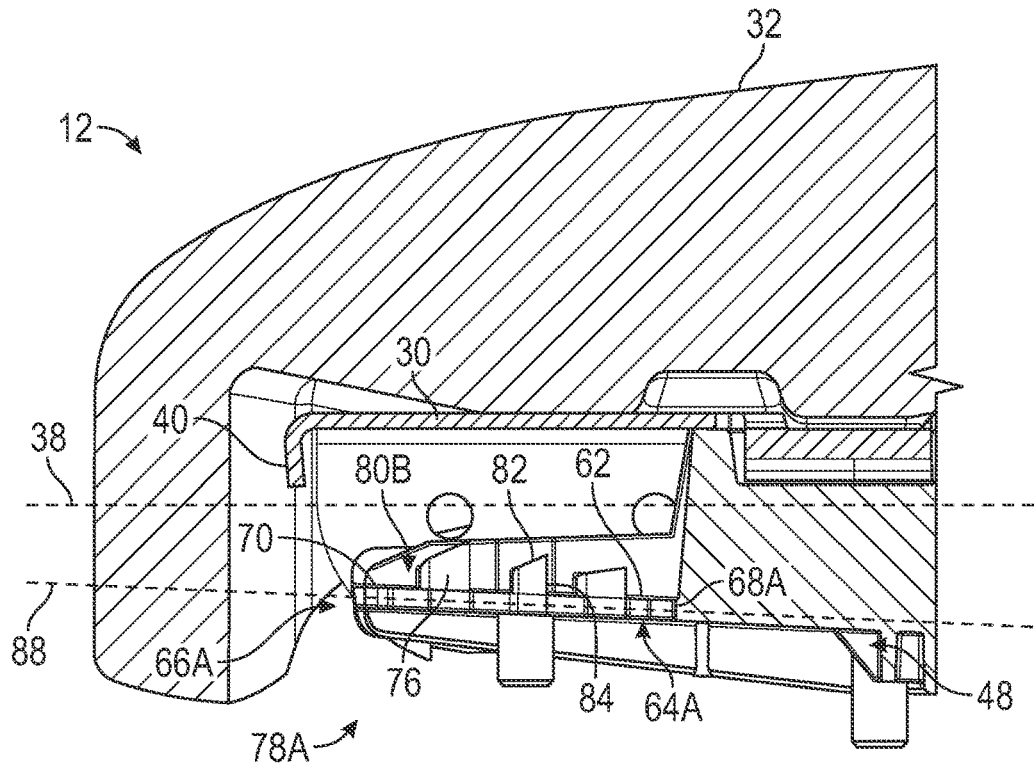
FIG. 8 is a left side elevation cross-sectional partial view of the armrest assembly of FIG. 2 taken along line 8-8 of FIG. 4.

As one example of a protrusion array with progressively reduced heights, FIGS. 7 and 8 illustrate right and left-hand cross-sectional views of the armrest assembly 12 taken vertically through the first channel 64A. As best illustrated in FIG. 7, the vertical heights H (e.g., the height of the protrusion relative to a surface from which the protrusion extends) of the protrusions 76 can vary along the first channel 64A. In the illustrated example, the height H of the protrusions 76 decrease from the open end 66A of the first channel 64A towards the terminal end 68A. That is, the protrusion 76 with the largest height H is arranged nearest the open end 66A of the first channel 64A and the protrusion with the smallest height H is arranged nearest the terminal end 68A of the first channel 64A. The varying heights of the protrusions 76 can further aid in resisting removal of a cover once the cover is received within the first channel 64A. For example, the engagement between the protrusions 76 and the cover increases as the height of the protrusion increases. Therefore, should the cover begin to pull out, the resulting increased engagement with the protrusions 76 near the open end 66A of the first channel 64A will tend to increase the overall retention engagement between the flexible cover and the plate 62 as a whole.

As best illustrated in FIG. 8, each of the protrusions 76 can define an engagement surface 82 that is sloped relative to the plate 62 along a distal end of the protrusions 76 (e.g., the portion of the protrusion 76 furthest from the plate 62. In the illustrated example, the engagement surface 82 forms a pointed tip at the trailing edge 84 of the protrusion 76 (e.g., an edge closest to the terminal end 68A of the first channel 64A). In that way, the height of the protrusion 76 increases in a direction from the open end 66A towards the terminal end 68A of the first channel 64A (e.g., in a direction transverse to the first reference axis 65A or the elongate axis 38). The pointed tip formed by the engagement surface 82 can grip a fabric (or other) cover and thereby further aid in resisting removal of a cover once the cover is received within the first channel 64A.

In the illustrated example, the plate 62 can define a generally flat, planar surface annotated by reference plane 88 that is substantially parallel to the elongate axis 38 (e.g., parallel to a top surface of the frame 30). In some examples, the reference plane 88 can correspond to a mold line for the bracket 48. According to some examples, the reference plane 88 of the plate 62 can deviate from parallel relative to the elongate axis 38 (e.g., by an angle that is less than 5 degrees) to further improve engaged between the protrusions 76 and material of a cover that is received into the channels 64A, 64B. In the illustrated example, the protrusions 76 can extend from the plate 62 such that the protrusions are substantially perpendicular to the reference plane 88 defined by the plate 62. According to other examples, the protrusions 76 can be substantially perpendicular to the elongate axis 38. Further, in some cases a reference plane of a retention plate can be parallel to an elongate axis of an armrest assembly.

As best illustrated in FIGS. 7 and 8, the protrusions 76 along the central portion 70 can extend away from the plate 62 in a first direction (e.g., substantially vertically upwards) and the protrusions 76 along the first lateral portion 72 can extend away from the plate 62 in an opposing second direction (e.g., substantially vertically downwards). According to other examples, the protrusions 76 along the central portion 70 can extend away from the plate 62 in the second direction and the protrusions 76 along the first lateral portion 72 can extend away from the plate 62 in the first direction. In some embodiments, protrusions on a central portion of a retention feature (e.g., the portion 70) can extend in a direction corresponding to a location of the material of a nose of a cover that, as installed, extends in a weaving pattern through a first of the channels, over the protrusions of the central portion, then through a second of the channels. Similarly, in such an arrangement, protrusions that extend in an opposite direction, on lateral portions (e.g., the portions 72, 74) of the retention feature, can also be oriented to securely engage the nose material.

Referring now to FIGS. 9-12, a method of installing a flexible cover configured as a fabric cover 90 onto the armrest assembly 12 and securing the fabric cover 90 by the cover retention bracket 48. In other implementations, similar operations can be used for other flexible covers. For example, multiple fabrics can be used such as cloths, vinyl, and foam backed materials. According to other examples, fireproof materials can be utilized to form a flexible cover. In other examples, a self-skinned foam can be used to form a flexible cover. Self-skinned foams can provide a thick surface layer that presents an aesthetically pleasing appearance such that they do not need a fabric covering. Such a self-skinned foam cover can include portions to be received within the channels of the cover retention feature. In some examples, the portions to be received in the channels can include a flexible injection molded polymer to provide additional structure. The flexible injection molded polymer can be configured as a shape complementary to that of the channels of the cover retention feature to snap fit to the cover retention feature. In other examples, a flexible cover can be formed from polyurethane, foam, rubber, and nylon.

Figure 9:
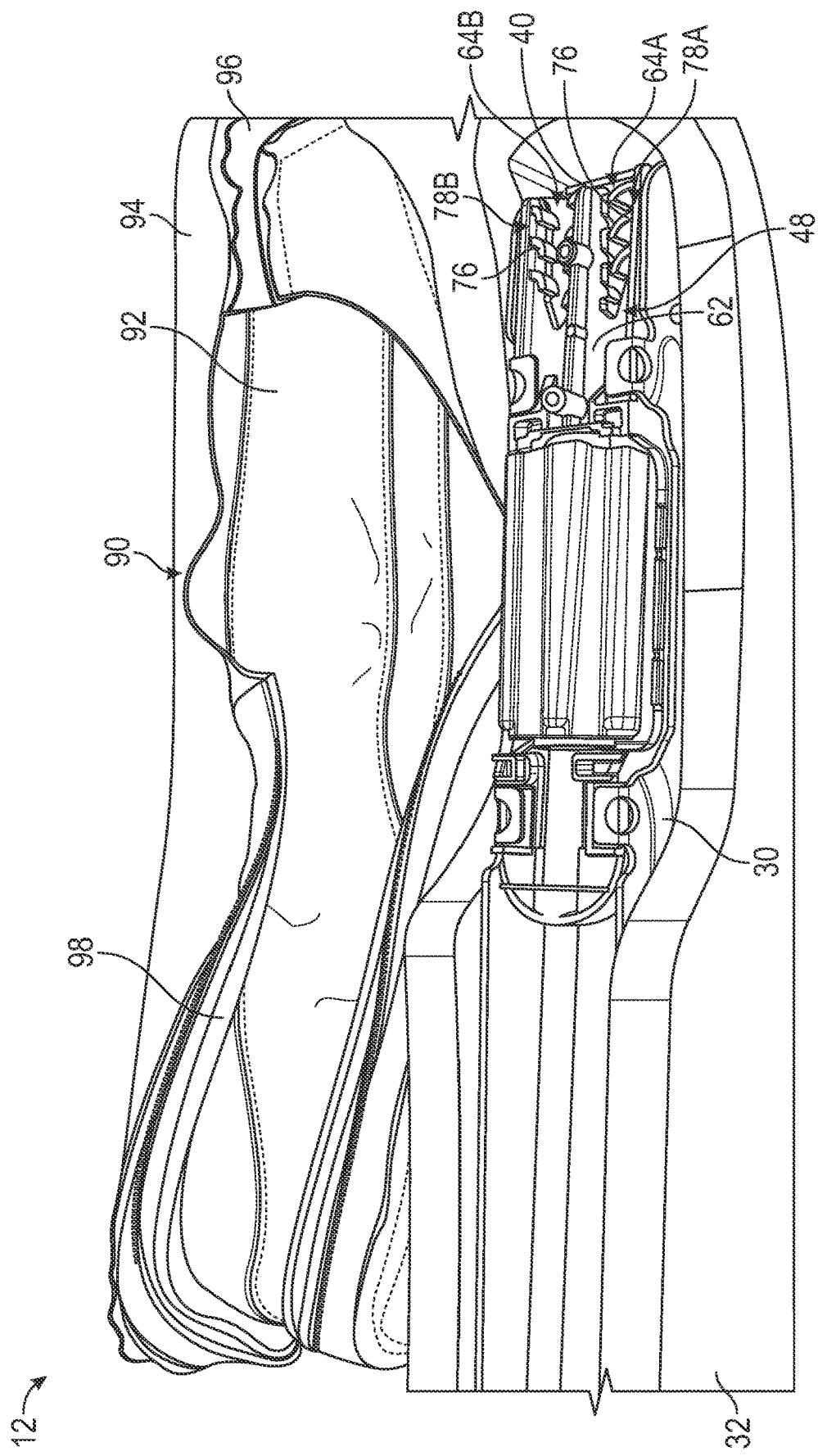
FIG. 9 is a bottom perspective view of an armrest assembly and an arm cover for the armrest assembly turned inside-out.
Figure 10:
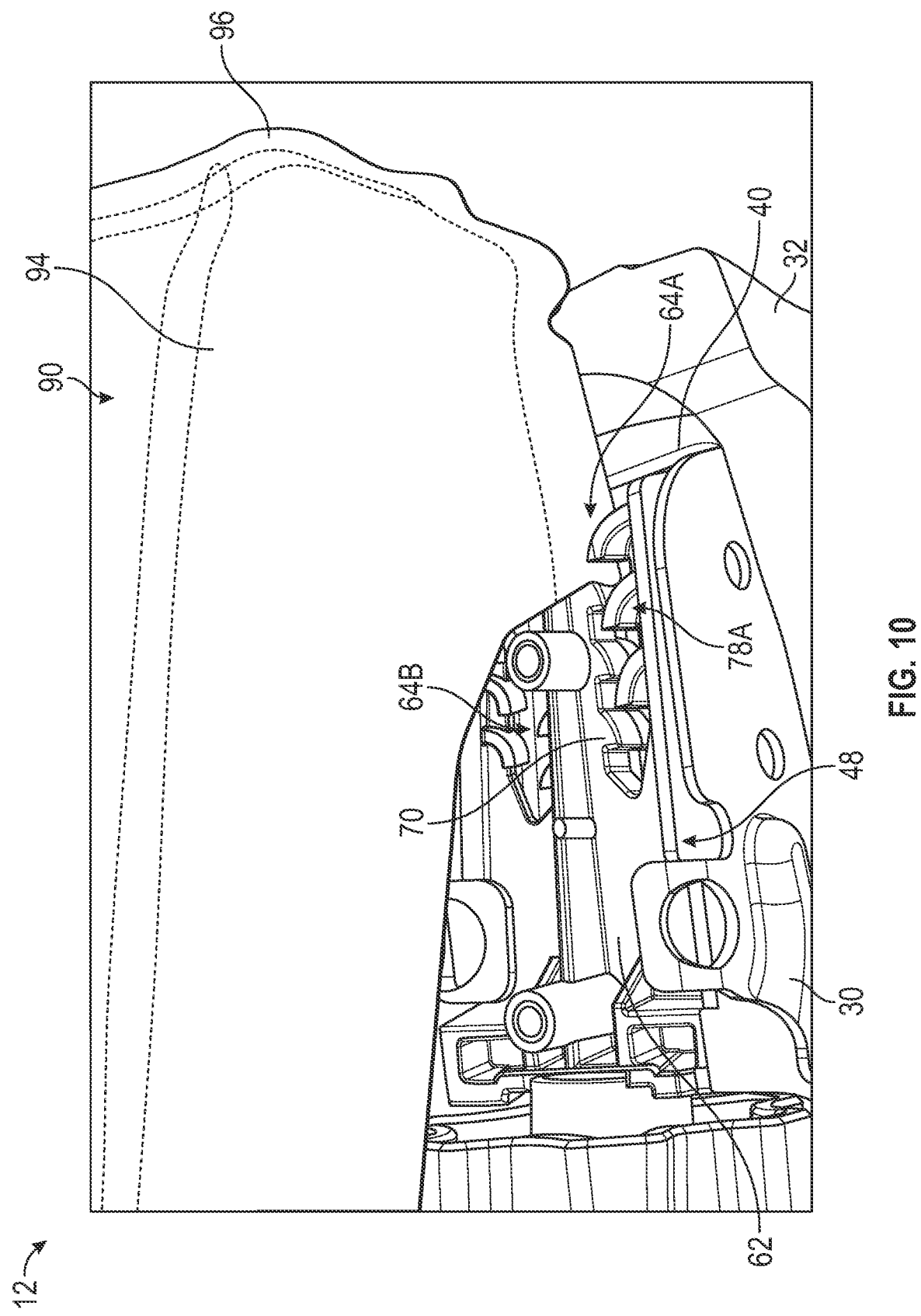
FIG. 10 is a bottom perspective view of the armrest assembly of FIG. 9 with the arm cover being inserted into a cover retention bracket during installation of the arm cover.

As shown in FIG. 9, the fabric cover 90 can be a pre-fabricated cover taking the general shape of the armrest assembly 12. Prior to installing the fabric cover 90 into the cover retention bracket 48, the fabric cover 90 can first be turned inside-out (e.g., inverted), such that an external surface 92 of the fabric cover 90 is arranged on the inside and an internal surface 94 of the fabric cover 90 is arranged on the outside. As shown in FIG. 10, a nose portion 86 of the fabric cover 90 can be inserted in an insertion direction, in the inside-out configuration, into the first and second channels 64A, 64B in the plate 62 of the cover retention bracket 48. When inserted, the fabric cover 90 weaves around the central portion 70 of the plate 62 such that material of the fabric cover 90 surrounds three sides of the central portion 70. In addition, edges of the protrusions 76 of the first and second protrusion arrays 78A, 78B that are facing the inside of the channels 64A, 64B, respectively, can engage and grip the mater of the fabric cover 90.

Figure 11:
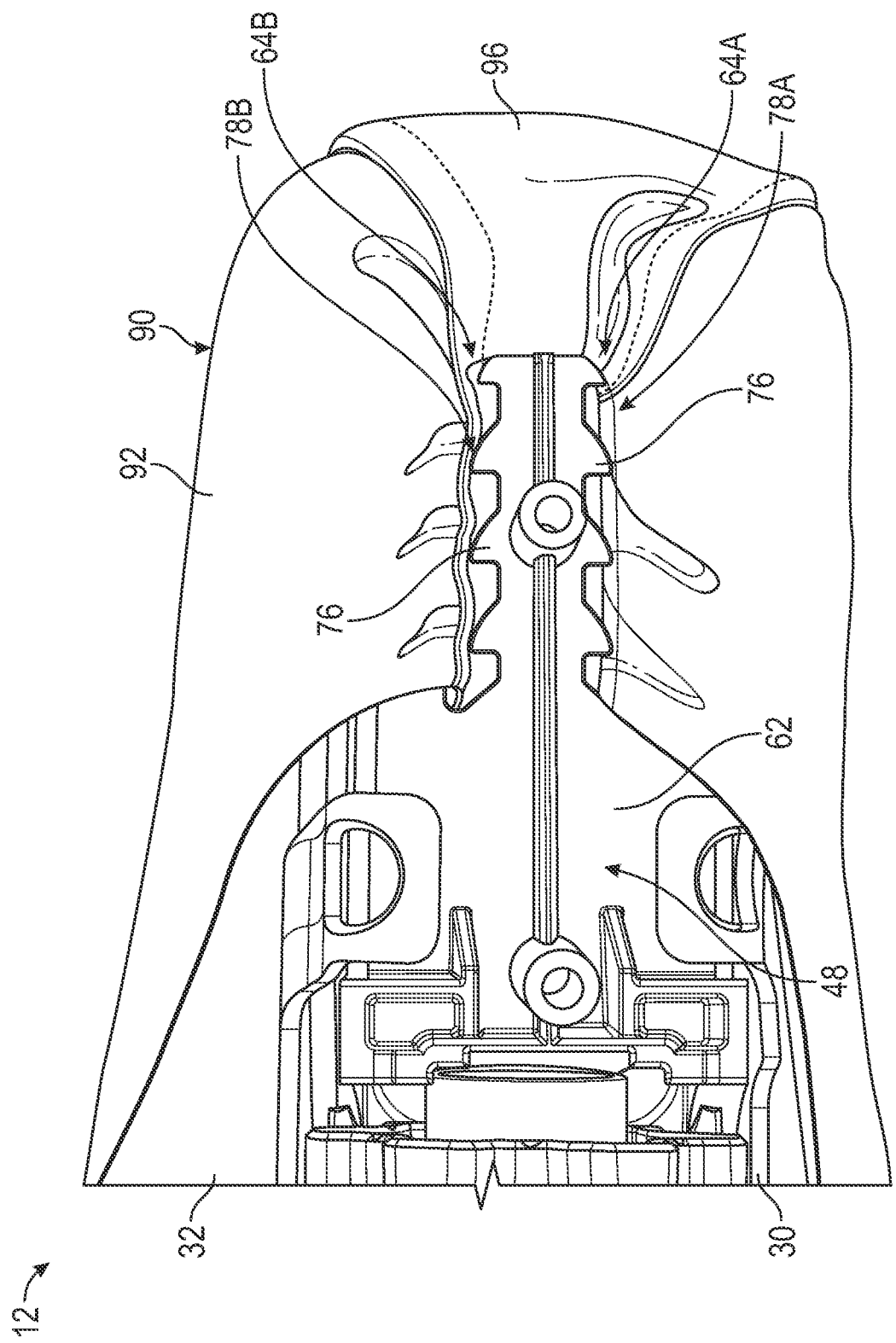
FIG. 11 is a bottom perspective partial view of the armrest assembly of FIG. 10 with a nose portion of the arm cover in an installed configuration.

As shown in FIG. 11, the nose portion 96 of the fabric cover 90 can then be inverted, while material of the nose portion 96 is still received within the first and second channels 64A, 64B of the cover retention bracket 48, such that the external surface 92 of the fabric cover 90 is arranged on the outside. Upon the fabric cover 90 being inverted, the protrusions 76 of the first and second protrusion arrays 78A, 78B, and particularly the sloped engagement surfaces 82 of the protrusions 76 (see FIG. 8), engage the material of the fabric cover 90 to stretch and secure the fabric cover over (and at) the nose end of the armrest assembly 12.

The stretching and securement of the fabric cover 90 is, at least in part, caused by the weaving of the fabric cover 90 through the first and second channels 64A, 64B, as well as the height H of the protrusions 76 (see FIG. 7), which takes up a length of material of the fabric cover 90 relative to a horizontal length of the material when the material is flat. Because the channels 64A, 64B take up this length of material of the fabric cover 90, the nose portion 96 of the fabric cover 90 can be tightly stretched around the armrest assembly 12 without the need for fasteners (e.g., staples or hog rings). That is, by utilizing the above described cover retention bracket 48 integrated into the frame 30 of the armrest assembly 12, the act of inverting the fabric cover 90 both secures the fabric cover 90 to the armrest assembly 12 and stretches the fabric cover 90 around the armrest assembly 12.

Figure 12:
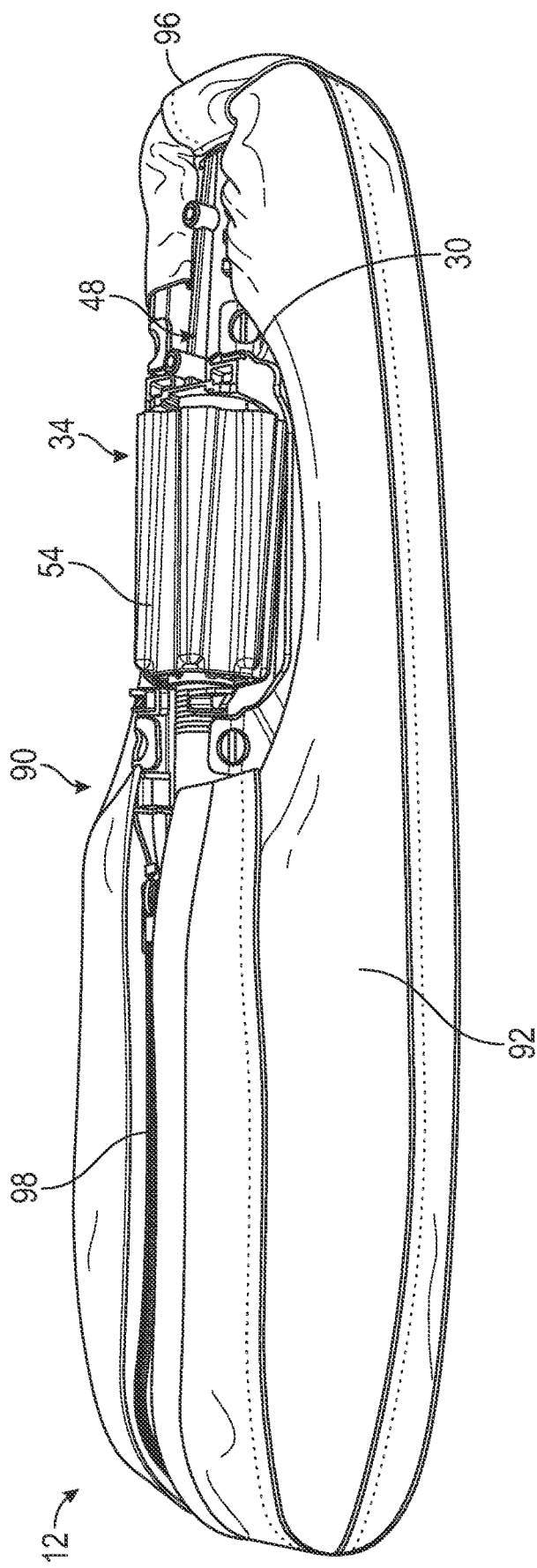
FIG. 12 is a bottom perspective view of the armrest assembly of FIG. 11 with the arm cover in a fully installed configuration relative to the armrest assembly.

As shown in FIG. 12, the remainder of the fabric cover 90 can then be stretched (or otherwise extended for installation) over the arm pad 32. In the illustrated example, an additional fastening element configured as a zipper 98 is arranged along an underside of the fabric cover 90 to secure the remainder of the fabric cover 90 over the armrest assembly 12. In other examples, the additional fastening element can be a button, staple, or other known fastening element for attaching a fabric cover to a frame or arm cover of an armrest assembly. Once the fabric cover 90 is secured to the armrest assembly 12, the external shell 36 (see FIG. 2) can then be installed into the cover retention bracket 48 of the frame 30 of the armrest assembly 12. In the illustrated example, the fabric cover 90 is configured to cover at least a portion of the armrest assembly 12. As shown in FIG. 12, the fabric cover 90 includes an opening to reveal the handle 54 of the adjustment mechanism 34. In other examples, the fabric cover 90 can be configured to cover the entirety of the armrest assembly 12.

Figure 13:
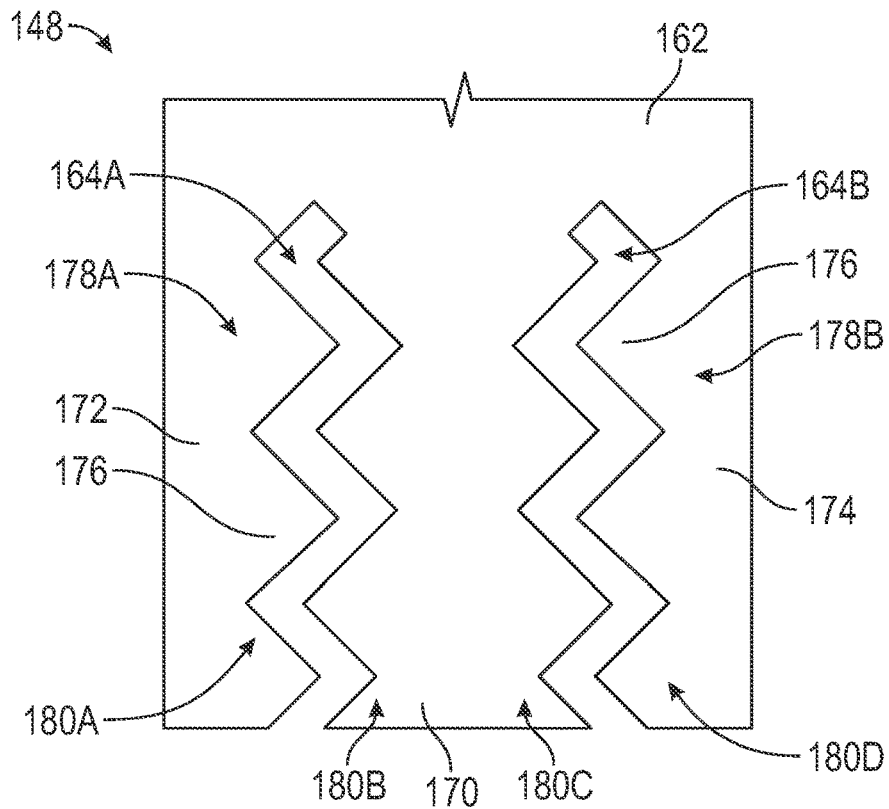
FIG. 13 is a schematic illustration of a cover retention bracket for use with an armrest assembly having channels and protrusions for securing a fabric or other flexible covering to an armrest assembly.
Figure 14:
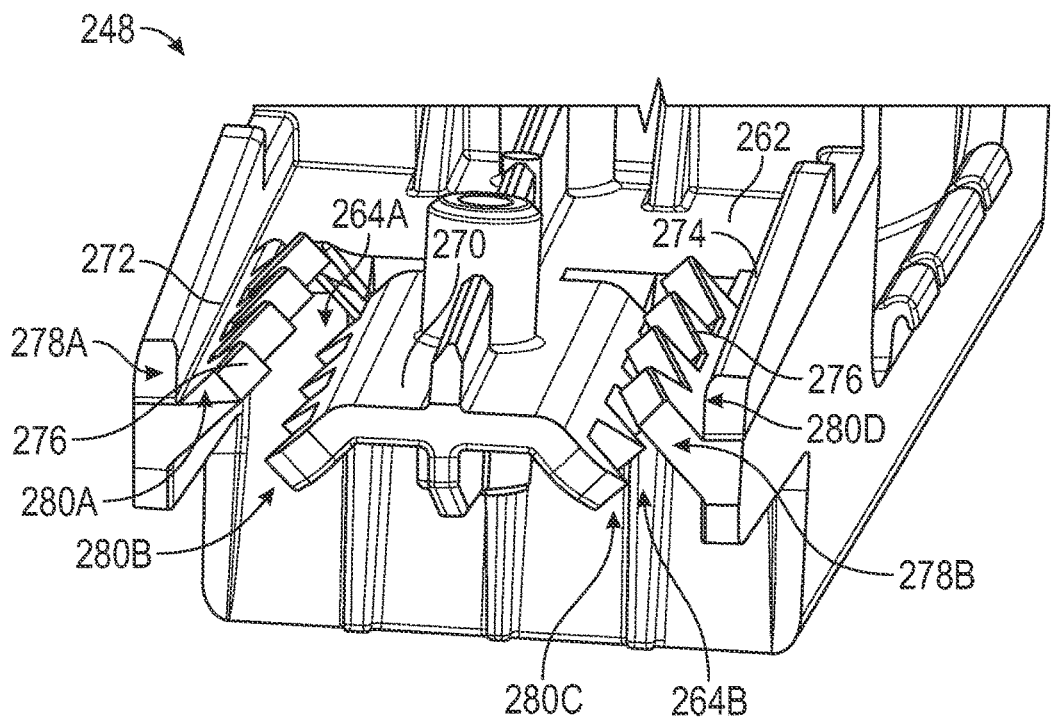
FIG. 14 is a front perspective view of a cover retention bracket for use with an armrest assembly having angled protrusions for securing a fabric or other covering.

Although FIGS. 3-12 illustrated one non-limiting example of a cover retention bracket, other configurations are also contemplated. For example, FIGS. 13 and 14 illustrate examples of plates 162, 262 that can be used in respective cover retention brackets 148, 248 to secure a fabric cover. In the illustrated example, like elements from FIGS. 3-12 are labeled using like reference numerals (e.g., plate 62 and plate 162, 262). For example, FIGS. 13 and 14 illustrate alternative configurations of cover retention brackets 148, 248 having a plate 162, 262. The plate 162, 262 can include first and second channels 164A, 264A, 164B, 264B forming a central portion 170, 270 and first and second lateral portions 172, 272, 174, 274. Protrusions 176, 276 can be arranged in first and second protrusion arrays 178A, 278A, 178B, 278B, which themselves, include first, second, third, and fourth sets of protrusions 180A-180D, 280A-280D. Generally, certain aspects of the cover retention bracket 148, 248 of FIGS. 13 and 14 are substantially similar to those discussed relative to FIGS. 3-12. However, the brackets differ in some aspects, including as described in the following paragraphs.

In the illustrated example of FIG. 13, the plurality of protrusions 176 are planar with the plate 162 of the cover retention bracket 148. In that way, the protrusions 176 extend laterally into the first and second channels 164A, 164B without protruding from a surface of the plate 162. In the illustrated example, the profile of the protrusions 176 is triangular, although other profiles are also possible (e.g., a square profile, a curved profile, etc.). In the illustrated example of FIG. 14, similar to that of FIG. 13, the plurality of protrusions 276 define a triangular profile. In the illustrated example, the protrusions 276 are bent relative to the planar surface of the plate 262. In some cases, portions of the protrusions 276 arranged in the first and second protrusion arrays 278A, 278B extend into their respective first and second channels 264A, 264B to laterally overlap. For example, with respect to the first protrusion array 278A, the protrusions 276 in the first set of protrusions 280A extend laterally into the first channel 264A, and similarly, the protrusions 276 in the second set of protrusions 280B laterally extend into the first channel 264A, such that portions of the protrusions 276 in the first set of protrusions 280A laterally overlap with portions of the protrusions 276 in the second set of protrusions 280B. The lateral overlapping of the protrusions 276 across the first and second channels 264A, 264B can increase the length of a weaving path required by the material of a cover. For example, a cover that, as installed, extends in a weaving pattern through the first channel 264A, over the protrusions 276 of the central portion 270, then through the second channel 264B, and the lateral overlapping of the protrusions 276 can increase the material required to weave therethrough.

In the illustrated embodiments, cover retention features are configured as a bracket including three-prongs for protrusions, including a central portion, and first and second lateral portions formed by first and second channels each having protrusions there along. However, in other embodiments, two- or one-prong arrangements can be utilized. For example, the central portion can have protrusions extending therefrom and the first and second lateral portions may not have protrusions. In other examples, the central portions may not have protrusions and the first and second lateral portions can have protrusions extending therefrom.

It is to be understood by those skilled in the art that the cover retention brackets described herein can included in other components of a vehicle seat assembly to secure a fabric (or other similar) covering to a vehicle seat component. For example, a cover retention bracket can be incorporated into a frame of a headrests, bolster, seat back, seat base, or other fabric-covered seat component to secure a covering to the seat component. These examples are to be understood as just a few examples of seat components and those skilled in the art recognize that others may fall within the scope of the present disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An armrest for a vehicle seat, the armrest comprising:
a frame defining an elongate axis extending along a length of the armrest;
a flexible cover that at least partially surrounds the frame in an installed configuration; and
a cover retention plate arranged adjacent to a distal end of the frame to secure the flexible cover, the cover retention plate including:
a first channel and a second channel arranged approximately parallel to the elongate axis of the frame, each of the first and second channels receiving a respective portion of the flexible cover with the flexible cover in the installed configuration;
a central portion arranged between the first channel and the second channel;
a first lateral portion arranged along an edge of the first channel opposite the central portion;
a second lateral portion arranged along an edge of the second channel opposite the central portion; and
at least one protrusion extending away from at least one of the central portion, the first lateral portion, or the second lateral portion to secure the flexible cover in the installed configuration.

2. The armrest of claim 1, wherein the at least one protrusion defines an engagement surface at a distal end of the at least one protrusion that is sloped relative to the elongate axis to form a pointed tip.

3. The armrest of claim 1, wherein the at least one protrusion includes:
a first protrusion extending away from the central portion of the cover retention plate in a first direction transverse to the elongate axis;
a second protrusion extending away from the first lateral portion of the cover retention plate in a second direction transverse to the elongate axis, opposite the first direction; and
a third protrusion extending away from the second lateral portion of the cover retention plate in the second direction.

4. The armrest of claim 3, wherein the first protrusion is included in a plurality of first protrusions arranged along the central portion of the cover retention plate to extend into the first and second channels and extending away from the central portion of the cover retention plate in the first direction;
the second protrusion is included in a plurality of second protrusions arranged along the first lateral portion of the cover retention plate to extend into the first channel and extending away from the first lateral portion of the cover retention plate in the second direction; and
the third protrusion is included in a plurality of third protrusions arranged along the second lateral portion of the cover retention plate to extend into the second channel and extending away from the second lateral portion of the cover retention plate in the second direction.

5. The armrest of claim 4, wherein one or more of:
the plurality of first protrusions includes a first set of protrusions with heights, in the first direction, that decrease along an insertion direction that extends from an open end to a closed end of one or more of the first channel or the second channel;
the plurality of second protrusions includes a second set of protrusions with heights, in the second direction, that decrease along the insertion direction; or
the plurality of third protrusions includes a third set of protrusions with heights, in the second direction, that decrease along the insertion direction.

6. The armrest of claim 1, wherein the at least one protrusion defines a curved profile that extends from the central portion into at least one of the first channel or the second channel to curve away from the distal end of the frame.

7. The armrest of claim 1, wherein the at least one protrusion includes:
first protrusions extending from the central portion of the cover retention plate into the first channel and the second channel, with heights of the first protrusions transverse to the elongate axis decreasing along an insertion direction of the first channel, from an open end of the first channel to a closed end of the first channel, and decreasing along the second channel along an insertion direction of the second channel, from an open end of the second channel to a closed end of the second channel;
second protrusions extending from the first lateral portion of the cover retention plate into the first channel, opposite the first protrusions, with heights of the second protrusions transverse to the elongate axis decreasing along the insertion direction of the first channel; and
third protrusions extending from the second lateral portion of the cover retention plate into the second channel, opposite the first protrusions, with heights of the third protrusions transverse to the elongate axis decreasing along the insertion direction of the second channel.

8. The armrest of claim 7, wherein the first and second protrusions are in a first alternating arrangement along opposing sides of the first channel, relative to the insertion direction of the first channel; and
wherein the second and third protrusions are in a second alternating arrangement along opposing sides of the second channel, relative to the insertion direction of the second channel.

9. A cover retention mechanism for securing a fabric or other cover to a vehicle seat component, the cover retention mechanism comprising:
a bracket including a retention feature defining a central portion, a first lateral portion, and a second lateral portion;
a first channel arranged between the central portion and the first lateral portion, and defining a first reference axis extending between a first open end at a distal end of the retention feature and a first terminal end opposite the first open end;
a second channel arranged between the central portion and the second lateral portion, and defining a second reference axis extending between a second open end at the distal end of the retention feature and a second terminal end opposite the second open end;
a first protrusion array extending away from the retention feature along the first channel; and
a second protrusion array extending away from the retention feature along the second channel;
wherein the first and second channels receive a portion of a fabric or other cover so that
the first and second protrusion arrays simultaneously engage the fabric or other cover.

10. The cover retention mechanism of claim 9, wherein the first reference axis of the first channel and the second reference axis of the second channel are approximately parallel to each other.

11. The cover retention mechanism of claim 9, each protrusion of a plurality of protrusions of the first and second protrusion arrays defines an engagement surface at a distal end that is sloped, relative to at least one of first and second reference axes and relative to an insertion direction of, respectively, the first or second channel, to form a pointed tip.

12. The cover retention mechanism of claim 11, wherein a height of each protrusion of the plurality of protrusions of the first protrusion array, relative to a first direction transverse to the first reference axis, increases towards an edge of the protrusion closest to the first terminal end of the first channel; and
wherein a height of each protrusion of the plurality of protrusions of the second protrusion array, relative to the first direction, increases towards an edge of the protrusion closest to the second terminal end of the second channel.

13. The cover retention mechanism of claim 9, wherein each protrusion in the first protrusion array extends into the first channel; and
wherein each protrusion in the second protrusion array extends into the second channel.

14. The cover retention mechanism of claim 9, wherein the first protrusion array includes a first protrusion, a second protrusion, and a third protrusion arranged in series along the first channel, the first protrusion having a larger height than the second protrusion, and the second protrusion having a larger height than the third protrusion;
wherein the second protrusion array includes a fourth protrusion, a fifth protrusion, and a sixth protrusion arranged in series along the second channel, the fourth protrusion having a larger height than the fifth protrusion, and the fifth protrusion having a larger height than the sixth protrusion.

15. The cover retention mechanism of claim 14, wherein the first protrusion is arranged nearer the first open end of the first channel than are the second and third protrusions; and
wherein the fourth protrusion is arranged nearer the second open end of the second channel than are the fifth and sixth protrusions.

16. The cover retention mechanism of claim 9, wherein the first protrusion array includes a first set of protrusions extending away from the first lateral portion of the retention feature in a first direction and a second set of protrusions extending away from the central portion of the retention feature in an opposing second direction; and
wherein the second protrusion array includes a third set of protrusions extending away from the second lateral portion of the retention feature in the first direction and a fourth set of protrusions extending away from the central portion of the retention feature in the second direction.

17. The cover retention mechanism of claim 16, wherein the first set of protrusions includes a first protrusion, a second protrusion, and a third protrusion arranged in series along the first lateral portion;
wherein the second set of protrusions includes a fourth protrusion, a fifth protrusion, and a sixth protrusion arranged in series along the central portion; and
wherein, relative to the first reference axis, the first protrusion is arranged axially between the fourth protrusion and the fifth protrusion.

18. The cover retention mechanism of claim 9, wherein each protrusion in the first protrusion array defines a curved profile that extends initially into the first channel then curves away from the first open end of the first channel; and
wherein each protrusion in the second protrusion array defines a curved profile that extends initially into the second channel then curves away from the second open end of the second channel.

19. The cover retention mechanism of claim 9, wherein each protrusion in the first and second protrusion arrays is substantially perpendicular to the retention feature.

20. A method of installing a flexible cover on an armrest assembly for use with a vehicle seat, the method comprising:
- with a nose portion of a flexible cover turned inside-out, inserting the nose portion into open ends of first and second channels of a cover retention feature that is coupled to a frame of the armrest assembly; and
- inverting the nose portion of the flexible cover, with the nose portion received in the first and second channels of the cover retention feature, such that an external surface of the nose portion is facing an exterior of the armrest assembly;
- wherein upon inverting the nose portion of the flexible cover, a first array of protrusions extending from the cover retention feature along the first channel and a second array of protrusions extending away from the cover retention feature along the second channel engage the nose portion of the flexible cover to retain the flexible cover in an installed configuration on the armrest assembly.

* * * * *